(12) United States Patent
Meeranpillai

(10) Patent No.: US 12,116,535 B2
(45) Date of Patent: Oct. 15, 2024

(54) EMULSION BREAKING

(71) Applicant: Saudi Arabian Oil Company, Dhahran (SA)

(72) Inventor: Nagoorpitchai S. Meeranpillai, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 256 days.

(21) Appl. No.: 17/409,477

(22) Filed: Aug. 23, 2021

(65) Prior Publication Data

US 2023/0058563 A1 Feb. 23, 2023

(51) Int. Cl.
| | |
|---|---|
| *C10G 33/00* | (2006.01) |
| *B01D 3/14* | (2006.01) |
| *B01D 17/04* | (2006.01) |
| *B01D 19/00* | (2006.01) |

(52) U.S. Cl.
CPC ............. *C10G 33/00* (2013.01); *B01D 3/143* (2013.01); *B01D 17/042* (2013.01); *B01D 19/0068* (2013.01); *C10G 2300/207* (2013.01)

(58) Field of Classification Search
CPC .. B01D 3/143; B01D 17/042; B01D 17/0205; B01D 17/047; B01D 19/0068; C10G 33/00; C10G 2300/207
See application file for complete search history.

(56) References Cited

U.S. PATENT DOCUMENTS

| | | | |
|---|---|---|---|
| 3,090,759 A | 5/1963 | Jenkins et al. | |
| 3,574,329 A | 4/1971 | Beavon | |
| 3,784,010 A | 1/1974 | Barra et al. | |
| 3,992,291 A | 11/1976 | Hirs | |
| 4,592,849 A | 6/1986 | McMillen | |
| 4,830,755 A | 5/1989 | Hardin | |
| 7,771,588 B2 | 8/2010 | Engel et al. | |
| 8,828,237 B2 | 9/2014 | Lange | |
| 10,350,515 B2 | 7/2019 | Al-Shafei et al. | |
| 2018/0195010 A1 | 7/2018 | Salu et al. | |

(Continued)

FOREIGN PATENT DOCUMENTS

| | | |
|---|---|---|
| EP | 0062527 | 10/1982 |
| WO | WO 2011121319 | 10/2011 |

OTHER PUBLICATIONS abanaki.com [online], "Removing oil from water," available on or before Oct. 11, 2015, via Internet Archive: Wayback Machine URL <https://web.archive.org/web/20151011031544/https://www.abanaki.com/articles/how-do-i-remove-oil-from-water/>, retrieved on Sep. 1, 2021, retrieved from URL <https://www.abanaki.com/articles/how-do-i-remove-oil-from-water/>, 4 pages.

(Continued)

*Primary Examiner* — Prem C Singh
*Assistant Examiner* — Brandi M Doyle
(74) *Attorney, Agent, or Firm* — Fish & Richardson P.C.

(57) ABSTRACT

A production stream from a well formed in a subterranean formation is flowed to a gas oil separation unit. The gas oil separation unit includes a separator vessel. The production stream includes an emulsion including an oil phase and an aqueous phase. Steam is mixed with the production stream prior to the production stream entering the separator vessel. Phases of the production stream are separated by the separator vessel to produce a vapor stream, an aqueous stream, and an oil stream.

6 Claims, 5 Drawing Sheets

(56) References Cited

U.S. PATENT DOCUMENTS

| | | | |
|---|---|---|---|
| 2019/0154204 A1* | 5/2019 | Lawson | C10G 33/00 |
| 2019/0194554 A1 | 6/2019 | Soliman | |
| 2020/0255748 A1* | 8/2020 | Soliman | C10G 32/02 |
| 2021/0246051 A1 | 8/2021 | Alghunaimi et al. | |
| 2023/0083202 A1 | 3/2023 | Meeranpillai | |

OTHER PUBLICATIONS

Abdulredha et al., "Overview on petroleum emulsions, formation, influence and demulsification treatment techniques," Arabian Journal of Chemistry, 2018, 43 pages.

aesarabia.com [online], "Oil removal systems," available on or before Apr. 8, 2016, via Internet Archive: Wayback Machine URL <https://web.archive.org/web/20160408115609/https://www.aesarabia.com/oil-removal-systems/>, retrieved on Sep. 1, 2021, retrieved from URL <http://www.aesarabia.com/oil-removal-systems/>, 7 pages.

Almojjly et al., "Removal of oil from oil-water emulsion by hybrid coagulation/sand filter as pre-treatment," Journal of Water Process Engineering, 2018, 26:17-27, 11 pages.

Bigui et al., "Filtration of oil from oily wastewater via hydrophobic modified quartz sand filter medium," Journal of Water Reuse and Desalination, 2018, 8(4):544-552, 9 pages.

Borges et al., "Breaking of Water-in-Crude-Oil Emulsions. 3. Influence of Salinity and Water-Oil Ratio on Demulsifier Action," Energy & Fuels, 2009, 23:1568-1574, 7 pages.

Carvalho et al., "Oil removal from oilfield produced water by sand filter," Brazilian Journal of Petroleum and Gas, 2016, 10(3):161-170, 12 pages.

Chung et al., "Geometrical Effect of Steam Injection on the Formation of Emulsions in the Steam-Assisted Gravity Drainage Process," The Journal of Canadian Petroleum Technology, Jan. 1988, 8 pages.

Goodarzi et al., "A Comprehensive Review on Emulsions and Emulsion Stability in Chemical and Energy Industries," The Canadian Journal of Chemical Engineering, Jan. 2019, 97:281-309, 29 pages.

machinerylubrication.com [online], "Options for removing water in oil," Williamson, Noria Corporation, available on or before Feb. 24, 2013, via Internet Archive: Wayback Machine URL<https://web.archive.org/web/20130224034745/https://www.machinerylubrication.com/Articles/Print/503>, retrieved on Sep. 1, 2021, retrieved from URL <https://www.machinerylubrication.com/Articles/Print/503>, 10 pages.

Maiti et al., "Removal of oil from oil-in-water emulsion using a packed bed of commercial resin," Colloids and Surfaces A: Physicochemical and Engineering Aspects, 2011, 389:291-298, 8 pages.

Shu et al., "Separation of SAGD produced emulsions through a combined pre-dewatering and demulsification process," Journal of Petroleum Science and Engineering, 2021, 201:108493, 12 pages.

smartwatermagazine.com [online], "New method for removing oil from water," University of Bonn, Feb. 18, 2020, retrieved on Sep. 1, 2021, retrieved from URL <https://smartwatermagazine.com/news/university-bonn/new-method-removing-oil-water>, 5 pages.

Srinivasan et al., "Oil removal from water using biomaterials," Bioresource Technology, 2010, 101:6594-6600, 7 pages.

Suzuki et al., "Removal of emulsified oil from water by coagulation and foam separation," Separation Science and Technology, 2005, 40:3407-3418, 13 pages.

yokogawa.com [online], "Refinery wastewater: oil & grease removal," available on or before Dec. 2020, retrieved on Sep. 1, 2021, retrieved from URL <https://web-material3.yokogawa.com/1/4788/files/AN10B01C20-05E.pdf ?_ga=2.195109676.1407680604.1630522247-1750430155.1630522247>, 3 pages.

SAIP Examination Report in Saudi Arabian Application No. 122440210, dated Nov. 11, 2023, 15 pages (with English translation).

* cited by examiner

EMULSION BREAKING

TECHNICAL FIELD

This disclosure relates to emulsion breaking, and in particular, breaking of oil-water emulsions.

BACKGROUND

Water occurs naturally in oil and gas wells and reservoirs, for example, from an underlying aquifer or from injector wells, and can mix with and be extracted with the produced hydrocarbons. Co-extraction of water along with mineral hydrocarbons requires expensive separation, treatment, and disposal, which in many cases involves re-injection back into the well. Water cut is the ratio of the quantity of water produced to the total quantity of fluids produced from the production well. As hydrocarbons are depleted from a reservoir, the decrease in reservoir pressure allows for increased water migration into the rock formations, resulting in an increase in water cuts over time. Gas oil separation processes separate produced fluid into gas, oil, and aqueous phases. In some cases, produced water (aqueous phase) is injected back into the subterranean formation, is used in hydraulic fracturing, or is treated and disposed.

SUMMARY

This disclosure describes technologies relating to breaking of oil-water emulsions. Certain aspects of the subject matter described can be implemented as a method. A production stream from a well formed in a subterranean formation is flowed to a gas oil separation unit. The gas oil separation unit includes a separator vessel. The production stream includes an emulsion including an oil phase and an aqueous phase. Steam is mixed with the production stream prior to the production stream entering the separator vessel. Phases of the production stream are separated by the separator vessel to produce a vapor stream, an aqueous stream, and an oil stream.

This, and other aspects, can include one or more of the following features. In some implementations, the steam is saturated steam. In some implementations, the saturated steam has an operating pressure in a range of from 0 pounds per square inch gauge (psig) to about 50 psig. In some implementations, a volume ratio of the steam to the production stream entering the separator vessel is 1 volume percent (vol. %) or less. In some implementations, the gas oil separation unit includes a degassing tank, a dehydrator, a desalter, and a stabilizer column. In some implementations, the oil stream is flowed to the degassing tank. In some implementations, phases of the oil stream are separated by the degassing tank to produce a second vapor stream, a second aqueous stream, and a second oil stream. In some implementations, the second oil stream is flowed to the dehydrator. In some implementations, phases of the second oil stream are separated by the dehydrator to produce a third aqueous stream and a third oil stream. In some implementations, the third oil stream is flowed to the desalter. In some implementations, phases of the third oil stream are separated by the desalter to produce a fourth aqueous stream and a fourth oil stream. In some implementations, the fourth oil stream is flowed to the stabilizer column. In some implementations, the fourth oil stream is fractionated by the stabilizer column to produce a bottoms stream that is a dry crude oil product. In some implementations, the dry crude oil product includes a salt content of 10 pounds per 1,000 barrels or less, a basic sediment and water (BS&W) content of 0.2 volume percent (vol. %) or less, and a hydrogen sulfide content of 40 parts per million (ppm) or less.

Certain aspects of the subject matter described can be implemented as a system. The system includes a production stream from a well formed in a subterranean formation. The production stream includes an emulsion including an oil phase and an aqueous phase. The system includes a steam stream, a gas oil separation unit, a first flowline, and a second flowline. The gas oil separation unit includes a separator vessel. The separator vessel includes an inlet, a vapor outlet, a first liquid outlet, and a second liquid outlet. The first flowline is connected to the inlet of the separator vessel. The first flowline is configured to flow the production stream to the separator vessel. The second flowline is connected to the first flowline, upstream of the inlet of the separator vessel. The second flowline is configured to flow the steam stream to the first flowline, such that the steam stream mixes with the production stream before the production stream enters the inlet of the separator vessel. The separator vessel is configured to separate phases of the production stream to produce a vapor stream, an aqueous stream, and an oil stream. The vapor outlet is configured to flow the vapor stream out of the separator vessel. The first liquid outlet is configured to flow the aqueous stream out of the separator vessel. The second liquid outlet is configured to flow the oil stream out of the separator vessel.

This, and other aspects, can include one or more of the following features. In some implementations, the steam is saturated steam. In some implementations, the saturated steam has an operating pressure in a range of from 0 pounds per square inch gauge (psig) to about 50 psig. In some implementations, a volume ratio of the steam to the production stream entering the separator vessel is 1 volume percent (vol. %) or less. In some implementations, the gas oil separation unit includes a degassing tank, a dehydrator, a desalter, and a stabilizer column. In some implementations, the degassing tank is configured to receive he oil stream and separate phases of the oil stream to produce a second vapor stream, a second aqueous stream, and a second oil stream. In some implementations, the dehydrator is configured to receive the second oil stream and separate phases of the second oil stream to produce a third aqueous stream and a third oil stream. In some implementations, the desalter is configured to receive the third oil stream and separate phases of the third oil stream to produce a fourth aqueous stream and a fourth oil stream. In some implementations, the stabilizer column is configured to receive the fourth oil stream and fractionate the fourth oil stream to produce a bottoms stream that is a dry crude oil product. In some implementations, the dry crude oil product includes a salt content of 10 pounds per 1,000 barrels or less, a basic sediment and water (BS&W) content of 0.2 volume percent (vol. %) or less, and a hydrogen sulfide content of 40 parts per million (ppm) or less.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes gas oil separation. Wet crude is an emulsion of oil (hydrocarbons) and water. Wet crude is flowed to a gas oil separation unit where phases of the wet crude are separated to produce a dry crude oil product. Steam (which is a form of water) is injected to the wet crude to mix with the wet crude and facilitate breaking of the oil-water emulsion and promote coalescence of the water droplets in the wet crude. Although the goal is to separate the aqueous phase from the oil phase, it was found that addition of water in the form of steam to the wet crude improved separation of the phases. The subject matter described in this disclosure can be implemented in particular implementations, so as to realize one or more of the following advantages. Implementation of the subject matter can improve efficiency of a gas oil separation process without incurring excess costs, as steam is a readily available utility in typical facilities. Because introducing steam to the wet crude improves separation of oil and aqueous phases, the gas oil separation process may be able to accommodate increased water cut without the need for expanding existing facilities. Implementation of the subject matter can improve dry crude oil product quality. Implementation of the subject matter can reduce the extent of treatment necessary on the separated aqueous phase for subsequent disposal or use. Implementation of the subject matter can reduce the amount of wash water needed in an oil desalting process. Implementation of the subject matter can reduce costs associated with the use of chemical demulsifiers. Implementation of the subject matter can increase handling capacity crude oil for a gas oil separation process.

Figure 1A:
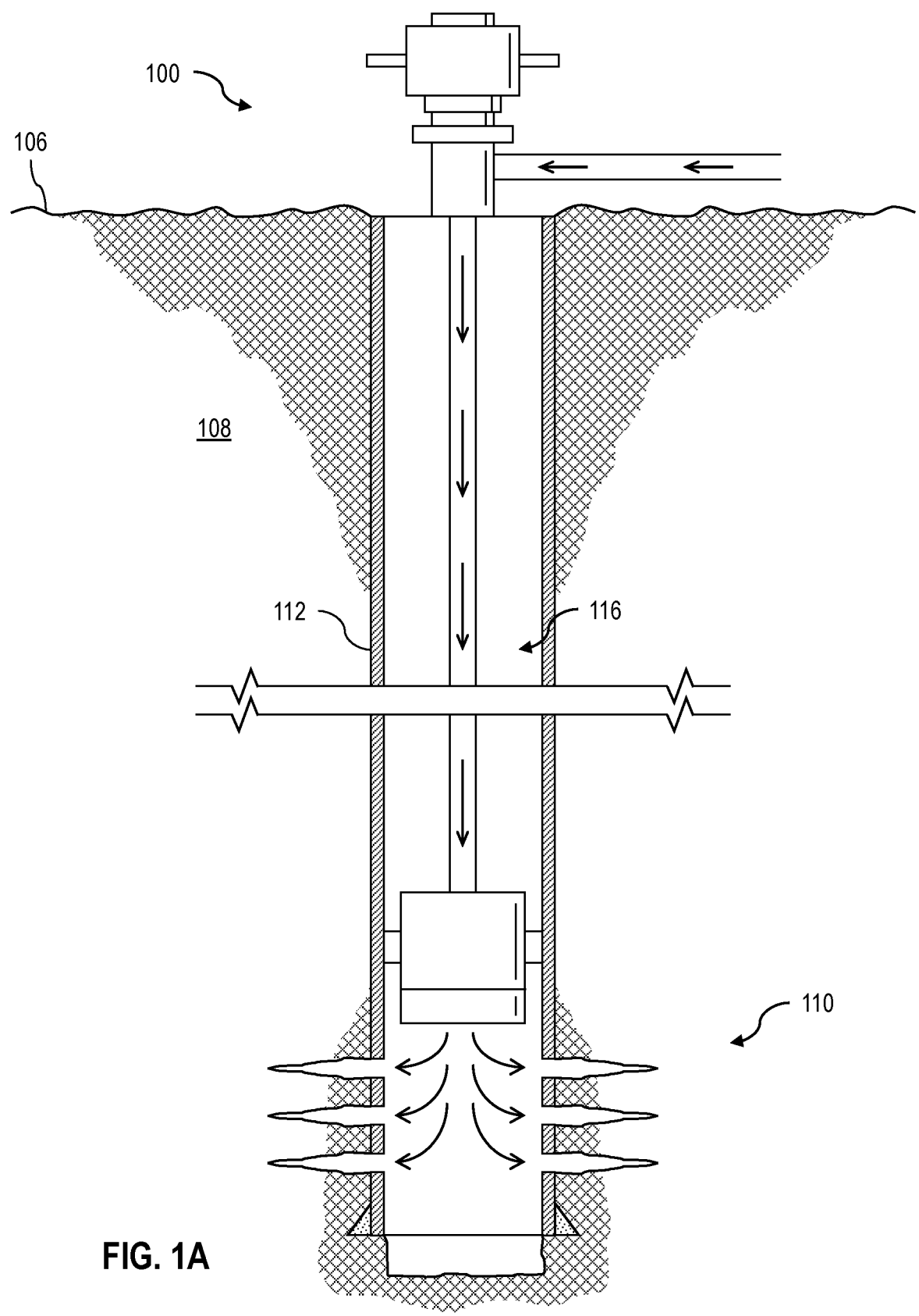
FIG. 1A is a schematic diagram of an example injection well.
Figure 1B:
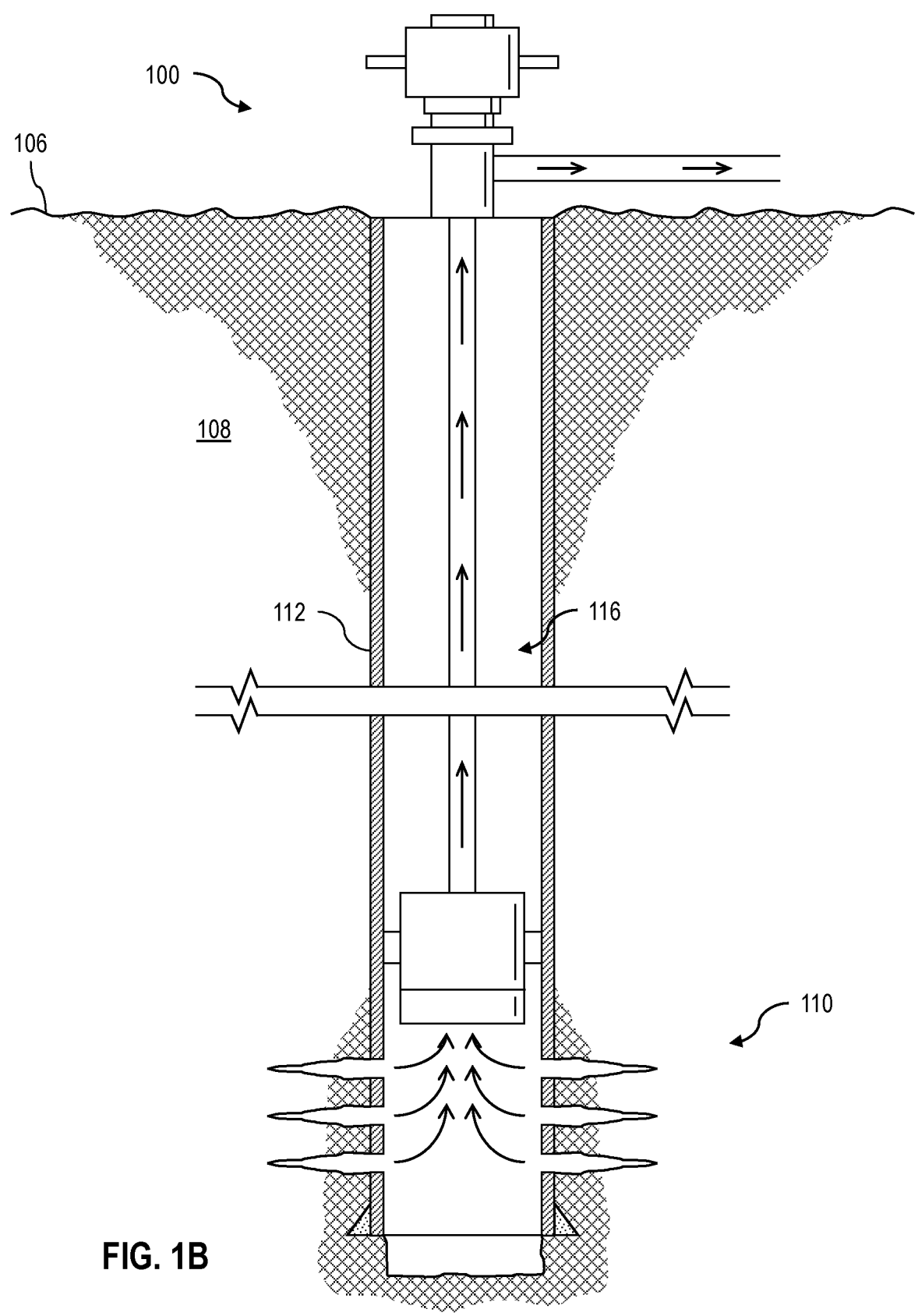
FIG. 1B is a schematic diagram of an example production well.

FIGS. 1A and 1B depict an example well 100 constructed in accordance with the concepts herein. The well 100 extends from the surface 106 through the Earth 108 to one more subterranean zones of interest 110 (one shown). The well 100 enables access to the subterranean zones of interest 110 to allow recovery (that is, production) of fluids to the surface 106 and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone 110 can include, for example, a formation, a portion of a formation, or multiple formations in a hydrocarbon-bearing reservoir from which recovery operations can be practiced to recover trapped hydrocarbons. In some implementations, the subterranean zone 110 includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, as shown in FIG. 1A, the well 100 is an injection well that is used to inject fluid from the surface 106 and into the subterranean zones of interest 110. The concepts herein, though, are not limited in applicability to injection wells, and could be used in production wells (such as gas wells or oil wells) as shown in FIG. 1B, wells for producing other gas or liquid resources or could be used in injection wells, disposal wells, or other types of wells similarly used in placing fluids into the Earth. The term "gas well" refers to a well that is used in producing hydrocarbon gas (such as natural gas) from the subterranean zones of interest 110 to the surface 106. While termed "gas well," the well need not produce only dry gas, and may incidentally or in smaller quantities, produce liquid including oil, water, or both. The term "oil well" refers to a well that is used in producing hydrocarbon liquid (such as crude oil) from the subterranean zones of interest 110 to the surface 106. While termed an "oil well," the well not need produce only hydrocarbon liquid, and may incidentally or in smaller quantities, produce gas, water, or both. In some implementations, the production from a gas well or an oil well can be multiphase in any ratio. In some implementations, the production from a gas well or an oil well can produce mostly or entirely liquid at certain times and mostly or entirely gas at other times. For example, in certain types of wells, it is common to produce water for a period of time to gain access to the gas in the subterranean zone.

The wellhead defines an attachment point for other equipment to be attached to the well 100. For example, FIG. 1B shows well 100 being produced with a Christmas tree attached to the wellhead. The Christmas tree includes valves used to regulate flow into or out of the well 100. The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIGS. 1A and 1B, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole." In particular, casing 112 is commercially produced in a number of common sizes specified by the American Petroleum Institute (the "API"), including 4½, 5, 5½, 6, 6⅝, 7, 7⅝, 7¾, 8⅝, 8¾, 9⅝, 9¾, 9⅞, 10¾, 11¾, 11⅞, 13⅜, 13½, 13⅝, 16, 18⅝, and 20 inches, and the API specifies internal diameters for each casing size.

Figure 2A:
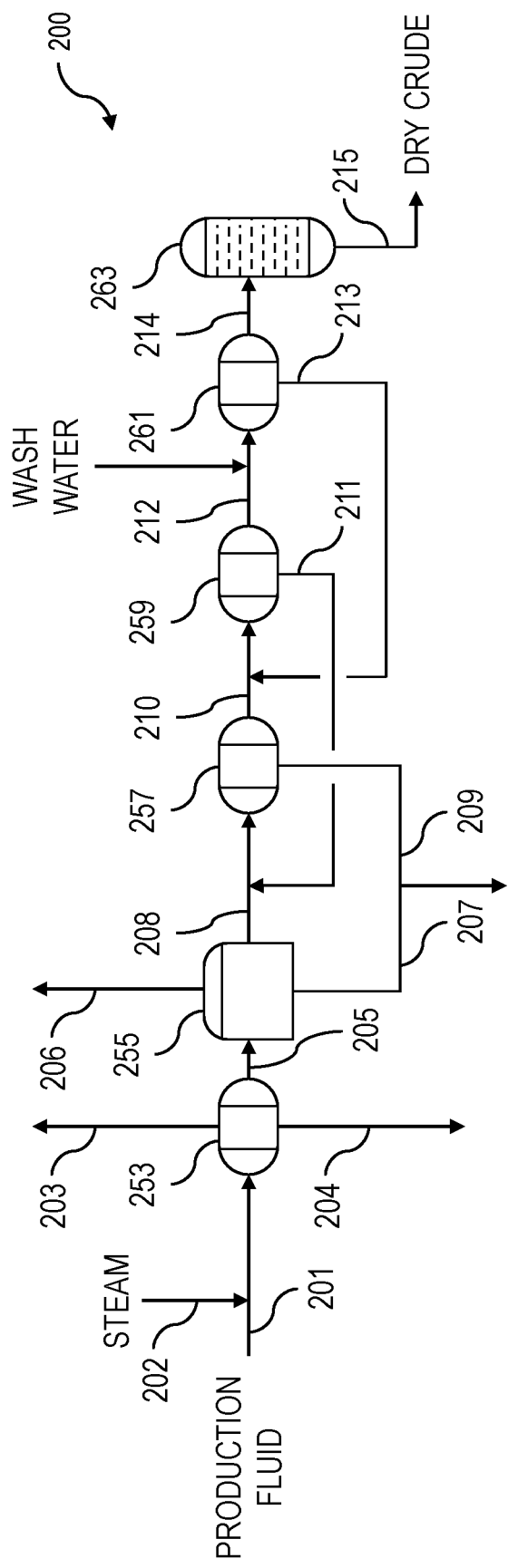
FIG. 2A is a schematic diagram of an example system for breaking an oil-water emulsion.

FIG. 2A depicts a crude oil processing unit 200 that separates water, salt, and vapors from the wet crude 201 produced from a well (for example, the production well 100 of FIG. 1B) to produce a dry crude oil product 215. The crude oil processing unit 250 includes a separator vessel 253, which is also referred to as a production trap. In some implementations, the crude oil processing unit 250 includes a degassing tank 255. In some implementations, the crude oil processing unit 250 includes a dehydrator 257. In some implementations, the crude oil processing unit 250 includes a 1$^{st}$ stage desalter 259. In some implementations, the crude oil processing unit 250 includes a 2$^{nd}$ stage desalter 261. In some implementations, the crude oil processing unit 250 includes a stabilizer column 263.

Wet crude 201 from a production well (for example, the production well 100 of FIG. 1B) flows to the production trap 253. The production trap 253 is a three-phase separator and removes a majority of the vapors 203 and water 204 from the crude oil. In some implementations, the operating pressure of the production trap 253 is in a range of about 50 pounds per square inch absolute (psia) to about 250 psia. In some implementations, the operating temperature of the production trap 253 is in a range of from about 62 degrees Fahrenheit (° F.) to about 160° F. Vapors 203 exit from the production trap 253.

Steam 202 is injected to be mixed with the wet crude 201 before the wet crude 201 enters the production trap 253. In comparison to the hydrocarbons in the wet crude 201, the water absorbs heat more quickly. The water droplets in the emulsion (wet crude 201) absorb heat from the steam 202, causing the water droplets in the emulsion to collapse. The collapse of water droplets in the emulsion causes the emulsion to break. The droplets of water can then coalesce to form larger droplets, which can more easily separate from the oil phase within the production trap 253. In sum, introduction of steam 202 (which is a form of water) to the wet crude 201 before entrance into the production trap 253 can facilitate separation of aqueous and oil phases within the production trap 253. In some implementations, the steam 202 is saturated steam (not superheated steam). In some implementations, the steam 202 (saturated steam) has an operating pressure in a range of from 0 pounds per square inch gauge (psig) to about 50 psig, from about 0 psig to about 40 psig, from about 0 psig to about 30 psig, from about 0 psig to about 20 psig, from about 0 psig to about 10 psig, from about 10 psig to about 50 psig, from about 20 psig to about 50 psig, from about 30 psig to about 50 psig, or from about 40 psig to about 50 psig. The steam 202 can have other operating pressures without departing from the scope of this disclosure. For example, if the operating pressure of the wet crude 201 is greater than 50 psia (such as 100 psia), then the steam 202 can have an operating pressure of 100 psia or greater, such that the steam 202 can be injected into the wet crude 201. In some implementations, a volume ratio of the steam 202 to the wet crude 201 (mixed together and entering the production trap 253) is about 1 volume percent (vol. %) or less. For example, the volume ratio of steam 202 to wet crude 201 is about 1 liter of steam 202 to 100 liters of wet crude 201. The volume ratio of the steam 202 to the wet crude 201 can be increased (for example, greater than 1 vol. %) to increase the operating temperature of the fluid entering the production trap 253.

The aqueous phase 204 can flow from the production trap 253 to a downstream water-oil separation process (not shown). The oil phase 205 flows from the production trap 253 to the degassing tank 255. In some implementations, the oil phase 205 flowing from the production trap 253 to the degassing tank 255 is heated (for example, by a heat exchanger) to increase the temperature of the oil phase 205 before entering the degassing tank 255.

The operating pressure in the degassing tank 255 is in a range of from about 1 psig to about 5 psig. In some implementations, the operating temperature of the degassing tank 255 is in a range of from about 65° F. to about 160° F. Vapors 206 exit from the degassing tank 255. The aqueous phase 207 can flow from the degassing tank 255 to the downstream water-oil separation process (not shown). The oil phase 208 flows from the degassing tank 255 to the dehydrator 257. In some implementations, the oil phase 208 flowing from the degassing tank 255 to the dehydrator 257 is heated (for example, by a heat exchanger) to increase the temperature of the oil phase 208 before entering the dehydrator 257. The dehydrator 257 separates phases of the oil phase 208 (for example, removes water from the oil phase 208) to produce an aqueous phase 209 and an oil phase 210. The aqueous phases from the production trap 253 (204), the degassing tank 255 (207), the dehydrator 257 (209), or any combination of these can be flowed to and treated in the downstream water-oil separation process (not shown), for example, to remove oil.

The oil phase 210 flows from the dehydrator 257 to the $1^{st}$ stage desalter 259. The $1^{st}$ stage desalter 259 separates phases of the oil phase 210 to produce an aqueous phase 211 and an oil phase 212. For example, the $1^{st}$ stage desalter 259 facilitates separation of water (and subsequent removal) from the oil phase 210. The oil phase 212 flows from the $1^{st}$ stage desalter 259 to the $2^{nd}$ stage desalter 261. The $2^{nd}$ stage desalter 261 separates phases of the oil phase 212 to produce an aqueous phase 213 and an oil phase 214. For example, the $2^{nd}$ stage desalter 261 facilitates separation of water (and subsequent removal) from the oil phase 212. In some implementations, at least a portion of the aqueous phase 211 from the $1^{st}$ stage desalter 259 is recycled upstream of the dehydrator 257. In some implementations, at least a portion of the aqueous phase 213 from the $2^{nd}$ stage desalter 261 is recycled upstream of the $1^{st}$ stage desalter 259. In some implementations, wash water is provided upstream of the $2^{nd}$ stage desalter 261. The oil phase 214 flows from the $2^{nd}$ stage desalter 261 to the stabilizer column 263. The stabilizer column 263 fractionates the oil phase 214 to produce a bottoms product 215. The bottoms product 215 from the stabilizer column 263 is the dry crude oil product 215. In some implementations, the crude oil processing unit 200 is configured to produce a dry crude oil product 215 having a salt content of at most 10 pounds per 1,000 barrels. In some implementations, the crude oil processing unit 200 is configured to produce a dry crude oil product 215 having a basic sediment and water (BS&W) content of at most 0.2 vol. %. In some implementations, the crude oil processing unit 200 is configured to produce a dry crude oil product 215 having a hydrogen sulfide content of less than about 4 parts per million (ppm), less than about 10 ppm, less than about 40 ppm, or less than about 60 ppm. In some implementations, the crude oil processing unit 200 is configured to produce a dry crude oil product 215 having a Reid vapor pressure (RVP) of at most 7 psia at 100° F. (1:4 liquid-to-gas ratio) and a true vapor pressure (TVP) of at most 13.4 psia at 130° F. (1:1 liquid-to-gas ratio).

Figure 2B:
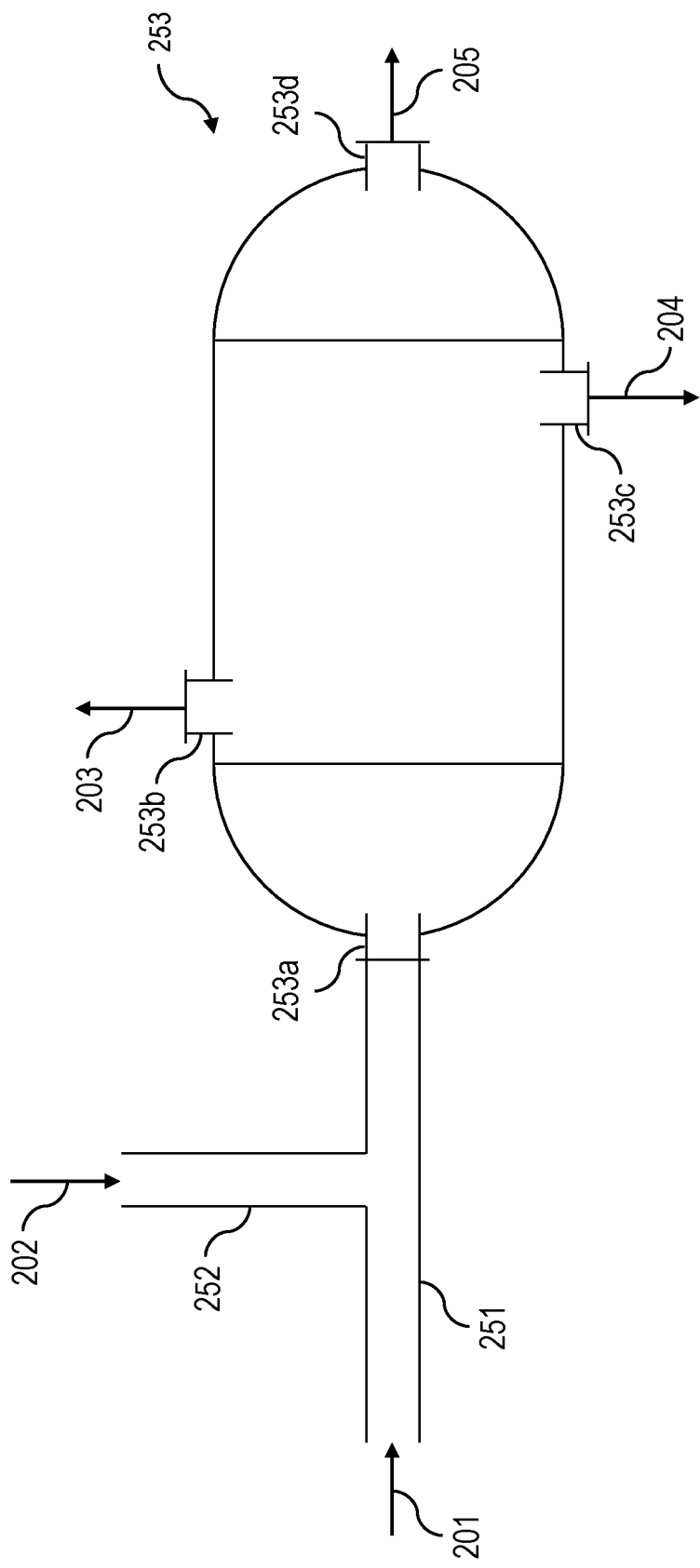
FIG. 2B is a schematic diagram of an example separator vessel of the system of FIG. 2A.

FIG. 2B shows the production trap 253 of system 200. The production trap 253 includes an inlet 253a, a vapor outlet 253b, a first liquid outlet 253c, and a second liquid outlet 253d. A first flowline 251 is connected to the inlet 253a. The first flowline 251 is configured to flow the wet crude 201 to the production trap 253. A second flowline 252 is connected to the first flowline 201, upstream of the inlet 253a. The second flowline 252 is configured to flow steam 202 to the first flowline 201, such that the steam 202 mixes with the wet crude 201 before the wet crude 201 enters the inlet 253a of the production trap 253. The production trap 253 is configured to separate phases of the wet crude 201 (and added steam 202) to produce the vapor stream 203, the aqueous stream 204, and the oil stream 205. The vapor outlet 253b is configured to flow the vapor stream 203 out of the production trap 253. The first liquid outlet 253c is configured to flow the aqueous stream 204 out of the production trap 253. The second liquid outlet 253d is configured to flow the oil stream 205 out of the production trap 253.

Figure 3:
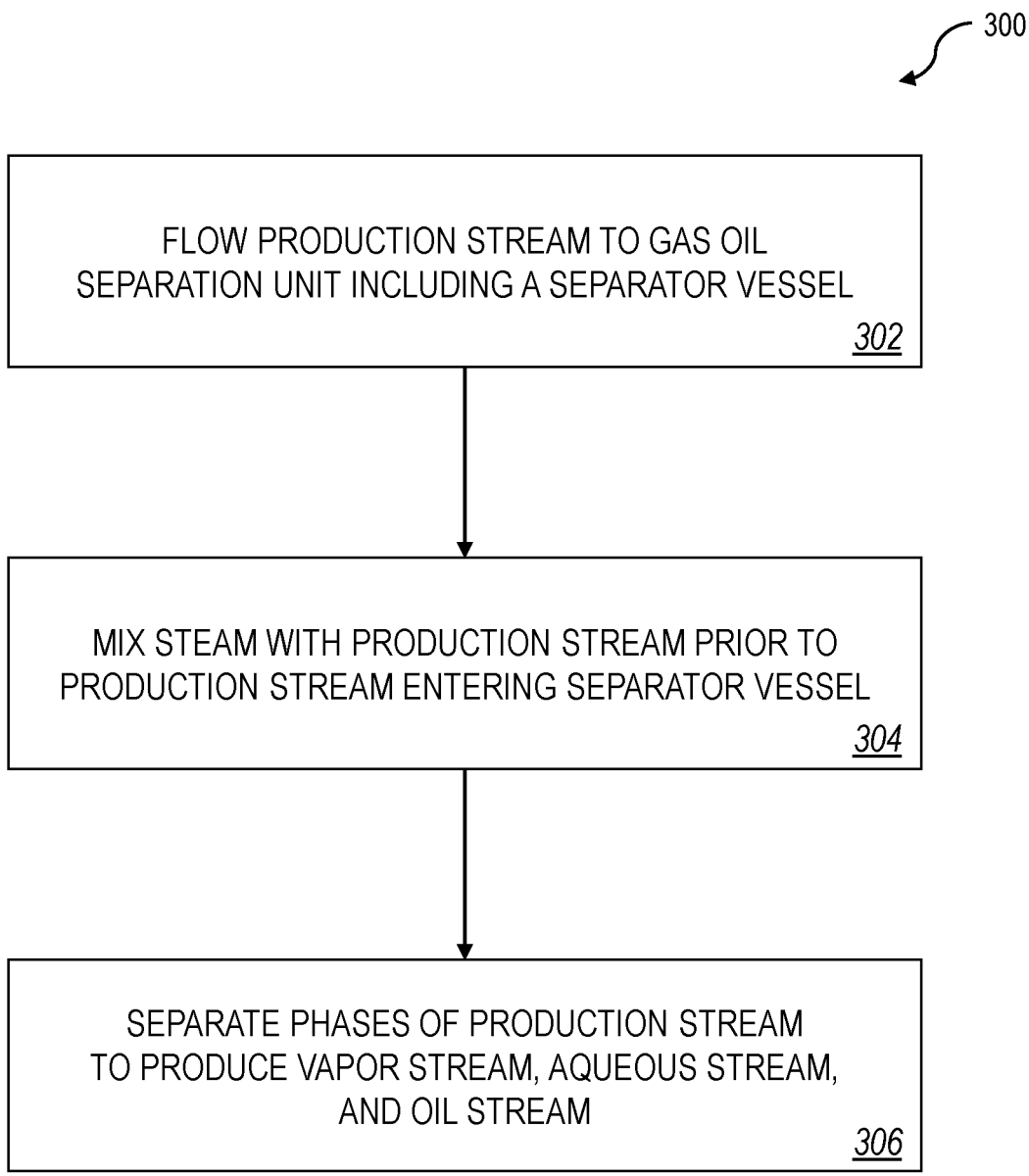
FIG. 3 is a block flow diagram of an example method for breaking an oil-water emulsion.

FIG. 3 is a flow chart of a method 300 for crude oil processing. At block 302, a production stream (201) from a well (100) formed in a subterranean formation is flowed to a gas oil separation unit (200) that includes a separator vessel (253). The production stream 201 includes an emulsion that includes an oil phase and an aqueous phase. For example, at block 304, production stream 201 is flowed from the well 100 via flowline 251 to the separator vessel 253.

At block 304, steam (202) is mixed with the production stream 201 prior to the production stream 201 entering the separator vessel 253. For example, at block 304, steam 202 is flowed via flowline 252 to flowline 251 at a point upstream of the separator vessel 253, such that the steam 202 mixes with the production stream 201 before the production stream 201 enters the separator vessel 253. In some implementations, the steam is saturated steam (not superheated steam). In some implementations, the steam 202 (saturated steam) has an operating pressure in a range of from 0 pounds per square inch gauge (psig) to about 50 psig. In some implementations, a volume ratio of the steam 202 to the wet crude 201 (mixed at block 304) is about 1 volume percent (vol. %) or less. For example, the volume ratio of steam 202 to wet crude 201 is about 1 liter of steam 202 to 100 liters of wet crude 201.

At block 306, phases of the production stream 201 (and added steam 202) are separated by the separator vessel 253 to produce a vapor stream 203, an aqueous stream 204, and an oil stream 205. In some implementations, the gas oil separation unit 200 includes a degassing tank 255, a dehydrator 257, a desalter 259, and a stabilizer column 263. In some implementations, the oil stream 205 is flowed to the degassing tank 255. In some implementations, phases of the oil stream 205 are separated by the degassing tank 255 to produce a second vapor stream 206, a second aqueous stream 207, and a second oil stream 208. In some implementations, the second oil stream 208 is flowed to the dehydrator 257. In some implementations, phases of the second oil stream 208 are separated by the dehydrator 257 to produce a third aqueous stream 209 and a third oil stream 210. In some implementations, the third oil stream 210 is flowed to the desalter 259. In some implementations, phases of the third oil stream 210 are separated by the desalter 259 to produce a fourth aqueous stream 211 and a fourth oil stream 212. In some implementations, the fourth oil stream 212 is flowed to the stabilizer column 263. In some implementations, the fourth oil stream 212 is fractionated by the stabilizer column 263 to produce a bottoms stream 215 that is the dry crude oil product 215. In some implementations, the dry crude oil product 215 has a salt content of at most 10 pounds per 1,000 barrels. In some implementations, the dry crude oil product 215 has a basic sediment and water (BS&W) content of at most 0.2 vol. %. In some implementations, the dry crude oil product 215 has a hydrogen sulfide content of less than about 4 ppm, less than about 10 ppm, less than about 40 ppm, or less than about 60 ppm. In some implementations, the dry crude oil product 215 has a Reid vapor pressure (RVP) of at most 7 psia at 100° F. and a true vapor pressure (TVP) of at most 13.4 psia at 130° F.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure.

Other changes, substitutions, and alterations are also possible without departing from the spirit and scope of the present disclosure.

What is claimed is:

1. A method comprising:
   flowing a production stream from a well formed in a subterranean formation to a separator vessel of a gas oil separation unit through a first flowline connected to an inlet of the separator vessel, the production stream comprising an emulsion comprising an oil phase and an aqueous phase in the form of droplets;
   flowing steam to the first flowline through a second flowline connected to the first flowline upstream of the inlet of the separator, thereby mixing steam with the production stream prior to the production stream entering the separator vessel and causing the droplets in the emulsion to collapse, which causes the emulsion to break, wherein a volume ratio of the steam to the production stream entering the separator vessel is 1 volume percent (vol. %) or less; and
   separating, by the separator vessel, phases of the production stream to produce a vapor stream, an aqueous stream, and an oil stream.

2. The method of claim 1, wherein the steam is saturated steam.

3. The method of claim 2, wherein the saturated steam has an operating pressure in a range of from 0 pounds per square inch gauge (psig) to about 50 psig.

4. The method of claim 3, wherein the gas oil separation unit comprises:
   a degassing tank;
   a dehydrator;
   a desalter; and
   a stabilizer column.

5. The method of claim 4, comprising:
   flowing the oil stream to the degassing tank;
   separating, by the degassing tank, phases of the oil stream to produce a second vapor stream, a second aqueous stream, and a second oil stream;
   flowing the second oil stream to the dehydrator;
   separating, by the dehydrator, phases of the second oil stream to produce a third aqueous stream and a third oil stream;
   flowing the third oil stream to the desalter;
   separating, by the desalter, phases of the third oil stream to produce a fourth aqueous stream and a fourth oil stream;
   flowing the fourth oil stream to the stabilizer column; and
   fractionating, by the stabilizer column, the fourth oil stream to produce a bottoms stream that is a dry crude oil product.

6. The method of claim 5, wherein the dry crude oil product comprises:
   a salt content of 10 pounds per 1,000 barrels or less;
   a basic sediment and water (BS&W) content of 0.2 volume percent (vol. %) or less; and
   a hydrogen sulfide content of 40 parts per million (ppm) or less.

* * * * *